(12) United States Patent
Tan et al.

(10) Patent No.: US 10,890,764 B2
(45) Date of Patent: Jan. 12, 2021

(54) METHOD AND SYSTEM FOR VIDEO FRAME PROCESSING

(71) Applicant: Novatek Microelectronics Corp., Hsinchu (TW)

(72) Inventors: Xianbo Tan, Shanxi Province (CN); Xiaoming Bu, Xi'an (CN); YuanJia Du, Shandong Province (CN)

(73) Assignee: Novatek Microelectronics Corp., Hsinchu (TW)

( * ) Notice: Subject to any disclaimer, the term of this patent is extended or adjusted under 35 U.S.C. 154(b) by 35 days.

(21) Appl. No.: 16/294,926

(22) Filed: Mar. 7, 2019

(65) Prior Publication Data

US 2020/0285053 A1  Sep. 10, 2020

(51) Int. Cl.
*G02B 27/01* (2006.01)
*H04N 19/513* (2014.01)
*G02B 27/00* (2006.01)
*H04N 19/59* (2014.01)

(52) U.S. Cl.
CPC ....... *G02B 27/017* (2013.01); *G02B 27/0025* (2013.01); *G02B 27/0093* (2013.01); *H04N 19/513* (2014.11); *H04N 19/59* (2014.11); *G02B 2027/0187* (2013.01)

(58) Field of Classification Search
CPC .. H04N 19/513; H04N 19/59; G02B 27/0025; G02B 27/0093; G02B 27/017; G02B 2027/0187; G06F 3/011
See application file for complete search history.

(56) References Cited

U.S. PATENT DOCUMENTS

| | | | |
|---|---|---|---|
| 2006/0232717 A1* | 10/2006 | Kervec | H04N 9/3123 348/761 |
| 2014/0347263 A1* | 11/2014 | Dai | G06F 3/017 345/156 |
| 2016/0267717 A1* | 9/2016 | Bar-Zeev | G06T 7/70 |
| 2018/0364801 A1* | 12/2018 | Kim | G06T 19/006 |
| 2019/0173929 A1* | 6/2019 | Guardini | H04L 65/605 |
| 2020/0034993 A1* | 1/2020 | Croxford | G06T 1/20 |

* cited by examiner

*Primary Examiner* — Abbas I Abdulselam
(74) *Attorney, Agent, or Firm* — JCIPRNET

(57) ABSTRACT

A method and a system for video frame processing are proposed. The method is applicable to a system including a computing device and a head-mounted display having a motion sensor, a processor, and a display. The method includes the following steps. A sequence of rendered video frames including a first frame and a second frame subsequent to the first frame is received by the processor from the computing device. A first head movement of the head-mounted display is obtained from the motion sensor by the processor, where the first head movement is associated with the first frame. An interpolated frame is rendered according to the first frame, the second frame, and the first head movement and displayed subsequent to the first frame and prior to the second frame on the display by the processor.

9 Claims, 5 Drawing Sheets

METHOD AND SYSTEM FOR VIDEO FRAME PROCESSING

TECHNICAL FIELD

The disclosure relates to a video frame processing technique.

BACKGROUND

Virtual reality (VR) creates an illusion of reality with realistic images, sounds, and other sensations that replicate a real environment or an imaginary setting. A virtual reality environment would offer a user immersion, navigation, and manipulation that simulate his physical presence in the real world or imaginary world. Current trends for virtual reality content revolve around the development of video games and movies. In order to deliver a fully immersive experience, a proliferation of powerful PC workstation hardware has been highly demanded. Most VR systems available in the market would require a graphics card capable of sustaining a minimum frame rate of 90 fps per eye, otherwise the user would likely to experience nausea or motion sickness.

SUMMARY OF THE DISCLOSURE

Accordingly, a method and a system for video frame processing that deliver a better visual experience with reduced hardware performance requirements are proposed.

According to one of the exemplary embodiments, the method is applicable to a system including a computing device and a head-mounted display having a motion sensor, a processor, and a display. The method includes the following steps. A sequence of rendered video frames including a first frame and a second frame subsequent to the first frame is received by the processor from the computing device. A first head movement of the head-mounted display is obtained from the motion sensor by the processor, where the first head movement is associated with the first frame. An interpolated frame is rendered according to the first frame, the second frame, and the first head movement and displayed subsequent to the first frame and prior to the second frame on the display by the processor.

According to one of the exemplary embodiments, the system includes a computing device and a head-mounted display having a motion sensor, a display, and a processor. The motion sensor is configured to detect movements of the head-mounted display. The display is configured to display rendered video frames. The processor is configured to receive a sequence of rendered video frames including a first frame and a second frame subsequent to the first frame from the computing device, obtain a first head movement of the head-mounted display from the motion sensor, render an interpolated frame according to the first frame, the second frame, and the first head movement, and display the interpolated frame subsequent to the first frame and prior to the second frame on the display.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
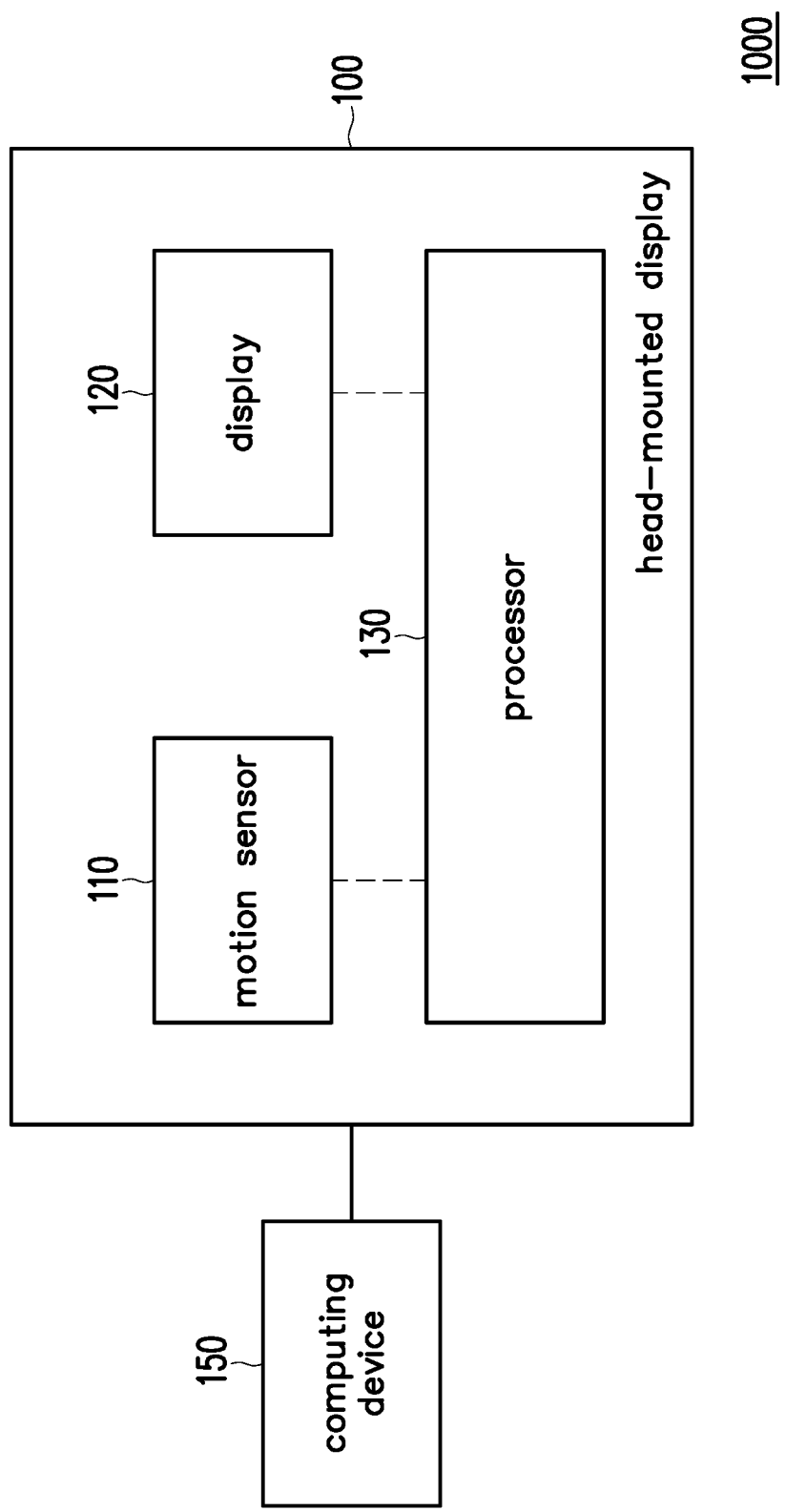
FIG. 1 illustrates a schematic diagram of a proposed system for video frame processing in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed system in accordance with one of the exemplary embodiments of the disclosure. All components of the system and their configurations are first introduced in FIG. 1. The functionalities of the components are disclosed in more detail in conjunction with FIG. 2.

Referring to FIG. 1, an exemplary system 1000 would at least include a head-mounted display 100 and a computing device 150. The head-mounted display 100 would further include a motion sensor 110, a display 120, and a processor 130, where the processor 130 would be connected to the motion sensor 110 and the display 120 via any wireless or wired transmission standard as known per se.

For illustrative purposes, in the present exemplary embodiment, the system 1000 may be implemented to a VR system. The head-mounted display 100 may be a headset or goggles with a build-in head-tracking system. The computing device 150 may be a computing device (e.g. a file server, a database server, an application server, a workstation, a personal computer, a laptop computer) with computing capability. In one exemplary embodiment, the computing device 150 may be integrated with the head-mounted display as an all-in-one system. It should be noted that, the system 1000 may be also implemented to a number of potential vision applications including, but not limited to a mixed reality (MR) system, an augmented reality (AR) system, and so forth. The disclosure is not limited in this regard.

The motion sensor 110 may be one or a combination of an accelerometer (e.g. G-sensor), a gyroscope (e.g. gyro-sensor), or any sensor that detects the linear movement, the direction of the linear movement, or the rotational movement (e.g. rotational angular velocity or rotational angle) of the VR headset. The display 120 may be a liquid crystal display (LCD), a light-emitting diode (LED) display, or the like. The processor 130 may be one or more of a North Bridge, a South Bridge, a field programmable array (FPGA), a programmable logic device (PLD), an application specific integrated circuit (ASIC), or other similar device or a combination thereof The processor may also be a central processing unit (CPU), a programmable general purpose or special purpose microprocessor, a digital signal processor (DSP), a graphics processing unit (GPU), other similar devices, integrated circuits, or a combination thereof.

Figure 2:
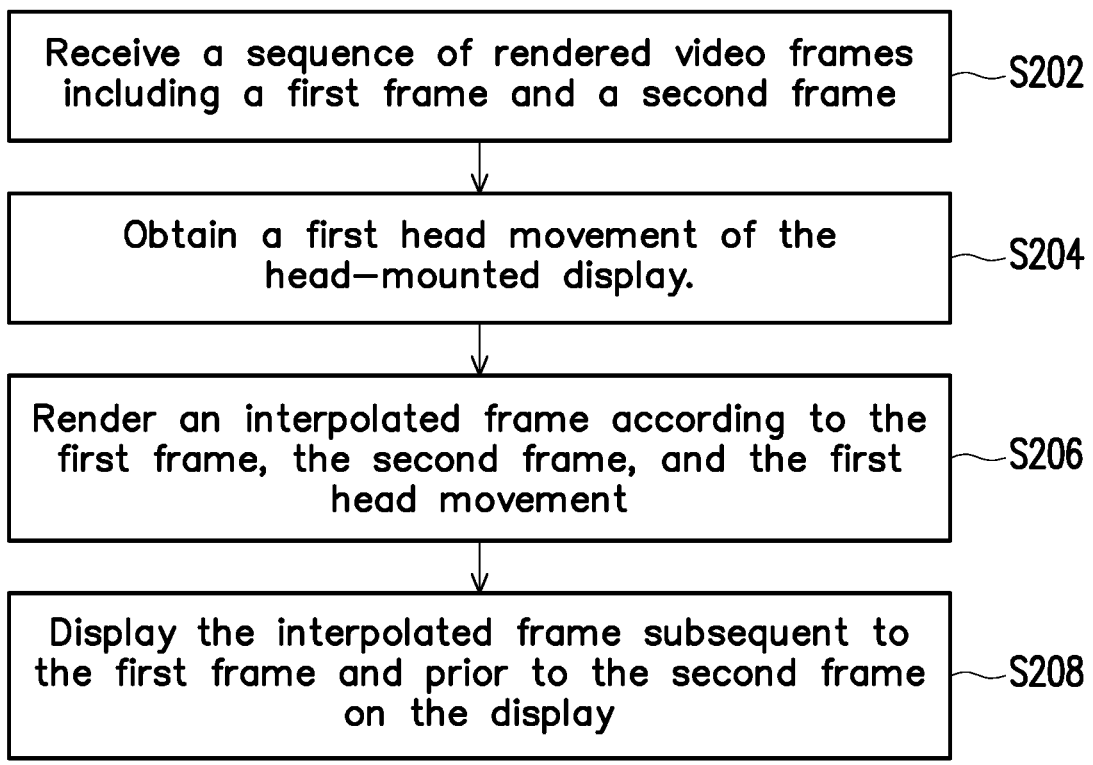
FIG. 2 illustrates a proposed method for video frame processing in accordance with one of the exemplary embodiments of the disclosure.

FIG. 2 illustrates a proposed method for video frame processing in accordance with one of the exemplary embodiments of the disclosure. The steps of FIG. 2 could be implemented by the system 1000 as illustrated in FIG. 1.

Referring to FIG. 2 along with FIG. 1, the processor 130 of the head-mounted display 100 would receive a sequence of rendered video frames including a first frame and a second frame subsequent to the first frame from the computing device 150 (Step S202). Herein, the sequence of rendered video frames may be rendered by the computing device 150 based on a video file received from the internet or other electronic devices via a communication interface either through wire or wireless transmission as known per se as well as the movements of the head-mounted display 100 continuously detected by the motion sensor 110. For illustrative purposes, the computing device 150 would render the video frames at a frame rate of 45 fps as opposed to a frame rate of 90 fps mostly required in the existing VR systems. The main purpose is to reduce the workload of the computing device 150, and the processor 130 would generate artificial in-between frames inserted between real frames to simulate a frame rate of 90 fps to ensure visual comfort presented on the display 120.

To be specific, the processor 130 would obtain a first head movement of the head-mounted display 100 from the motion sensor 110 (Step S204) and render an interpolated frame according to the first frame, the second frame, and the first head movement (Step S206). Once the first head movement is detected, a head angle corresponding to the first head movement (referred to as "a first head angle" hereafter) would then be obtained. Suppose that the first head movement is associated with the first frame. The processor 130 would be able to create an artificial frame between the first frame and the second frame to reduce system latency by using a motion estimation and motion compensation (MEMC) technique. The processor 130 would first estimate a predicted head angle corresponding to an interpolated time point associated with the interpolated frame according to the first head angle.

In detail, suppose that the first head angle is detected at time Tc corresponding to the first frame. The processor 130 may estimate a predicted head angle at time $T_P$ corresponding to the interpolated frame according to the first head angle as well as a first angular velocity and a first angular acceleration detected also at time Tc based on Eq. (1):

$$\emptyset_P = \emptyset_C + \omega_C(T_P - T_C) + \frac{a_0(T_P - T_C)^2}{2} \qquad \text{Eq. (1)}$$

Figure 3:
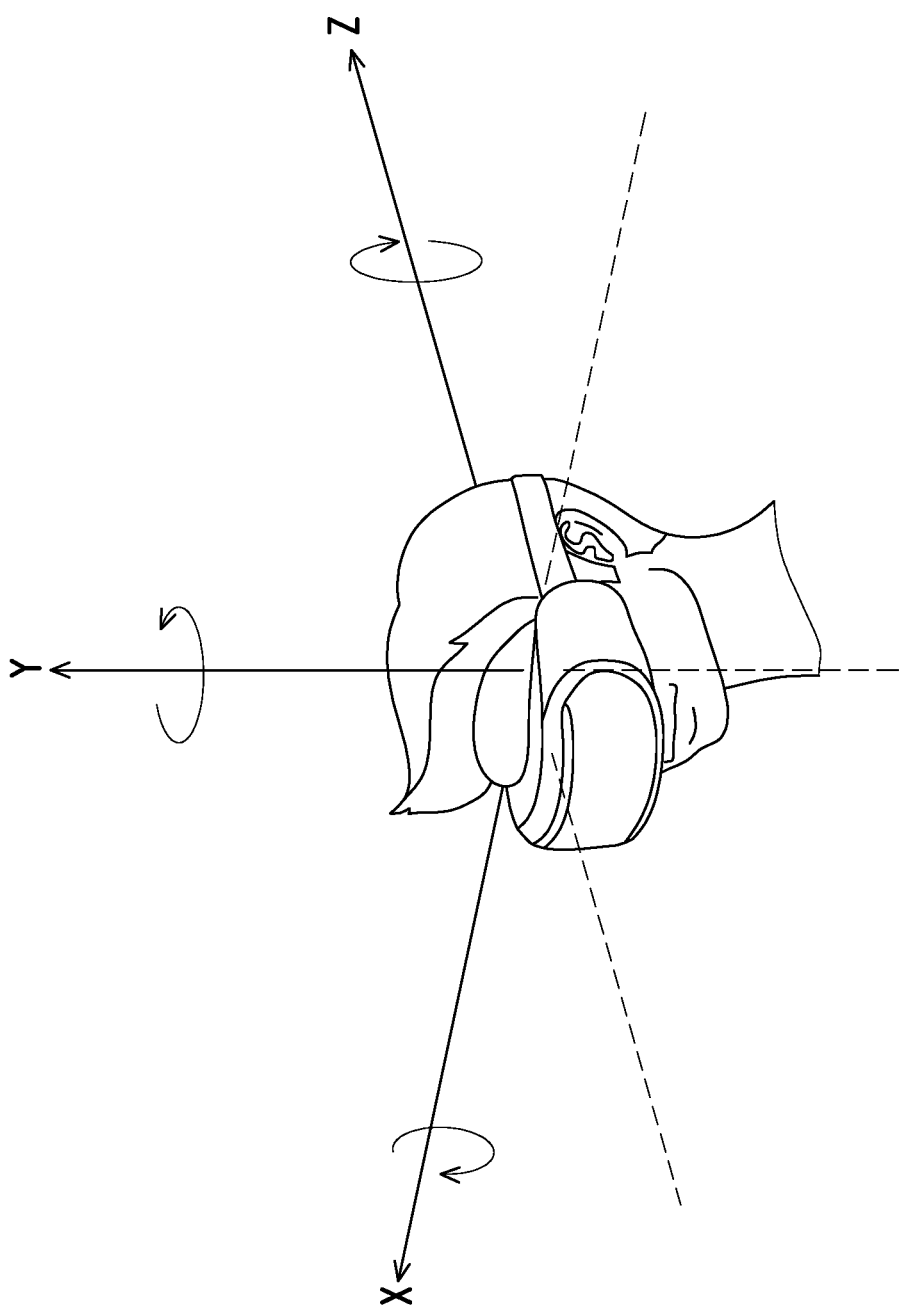
FIG. 3 illustrates a schematic diagram of a head position coordinate system in accordance with one of the exemplary embodiments of the disclosure.

Herein, $\emptyset_C$ denotes the angle of the head pose in the three axis-angles at time Tc and is considered as the first head angle, where $\emptyset_C$ is in a form of a three-dimensional vector $[\emptyset_{xC}, \emptyset_{yC}, \emptyset_{zC}]$ that respectively represent three axis-angles in X, Y, and Z directions in a head position coordinate system as illustrated in FIG. 3. $\omega_C$ denotes the angular velocity of the head pose in the three-axes angle time Tc and is considered as the first angular velocity, where $\omega_C$ is in a form of a three-dimensional vector $[\omega_{xC}, \omega_{yC}, \omega_{zC}]$ that respectively represent the angular velocity in X, Y, and Z directions. $\alpha_C$ denotes the angular acceleration of the head pose in the three-axes angle time Tc, where $\alpha_C$ is in a form of a three dimensional vector $[\alpha_{xC}, \alpha_{yC}, \alpha_{zC}]$ that respectively represent the angular acceleration in X, Y, and Z directions. $\emptyset_P$ denotes the angle of the head pose in the three axis-angles at time $T_P$ and is considered as the first head angle, where $\emptyset_P$ is in a form of a three-dimensional vector $[\emptyset_{xP}, \emptyset_{yP}, \emptyset_{zP}]$ that respectively represent three axis-angles in X, Y, and Z directions.

On the other hand, the processor 130 would also perform motion estimation on the first frame and the second frame to obtain a first motion vector, estimate an interpolated motion vector corresponding to the interpolated frame according to the first motion vector, and generate an interpolated content according to the interpolated motion vector. For example, if the interpolated frame is inserted at the temporal midpoint between the first frame and the second frame, the interpolated motion vector would have a half magnitude of the first motion vector along the same trajectory.

Next, the processor 130 would incorporate the predicted head angle into the interpolated content to render the interpolated frame that expresses the user's view towards the display 120. The processor 130 may transform the predicted head angle to a view matrix by using open source "Open GL Mathematics (GLM) library" and render the interpolated frame according to the interpolated content and the view matrix.

Referring back to FIG. 2, once the interpolated frame is rendered, the processor 130 would display the interpolated frame subsequent to the first frame and prior to the second frame on the display 120 (Step S208). Therefore, even the head-mounted display 100 takes a video signal with a frame rate of 45 fps as input, it may still deliver a visual experience that is almost as good as native 90 fps rendering performance. As a side note, in the present exemplary embodiment, the processor 130 may perform lens distortion on the interpolated frame before the interpolated frame while the computing device 150 may perform lens distortion on the rendered video frames. In another exemplary embodiment, the processor 130 may perform lens distortion on the rendered video frames as well as the interpolated frames to offload the computing tasks of the computing device 120. The disclosure is not limited in this regard.

Figure 4A:
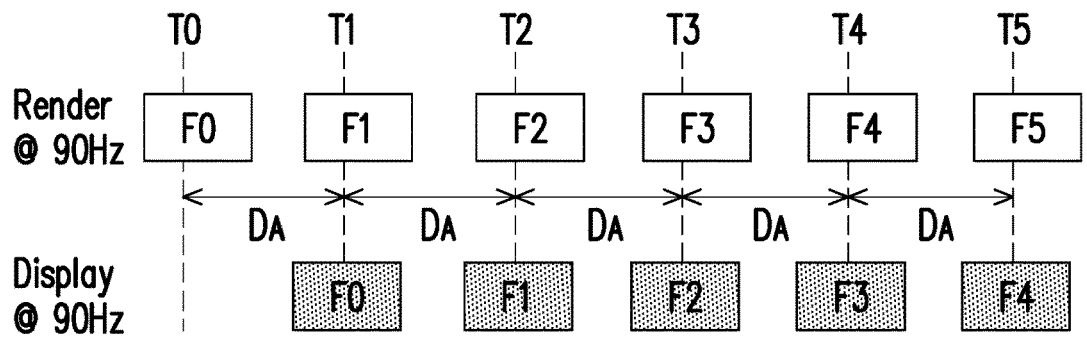
FIG. 4A illustrates a frame progression of an existing VR system running at 90 Hz.
Figure 4B:
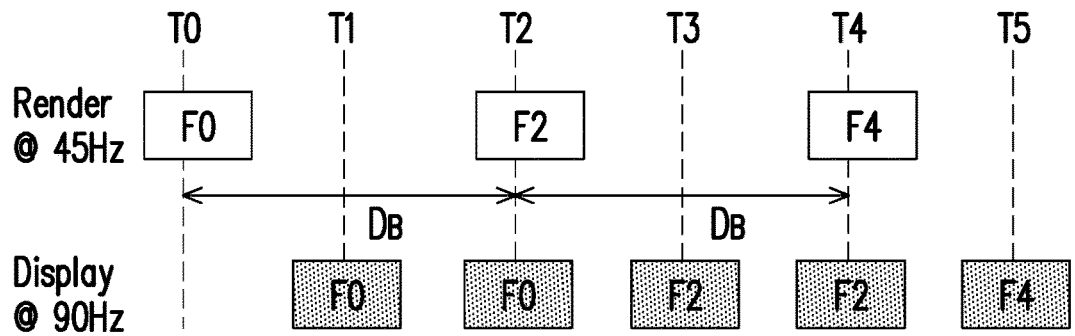
FIG. 4B illustrates a frame progression of an existing VR system running at 45 Hz.
Figure 4C:
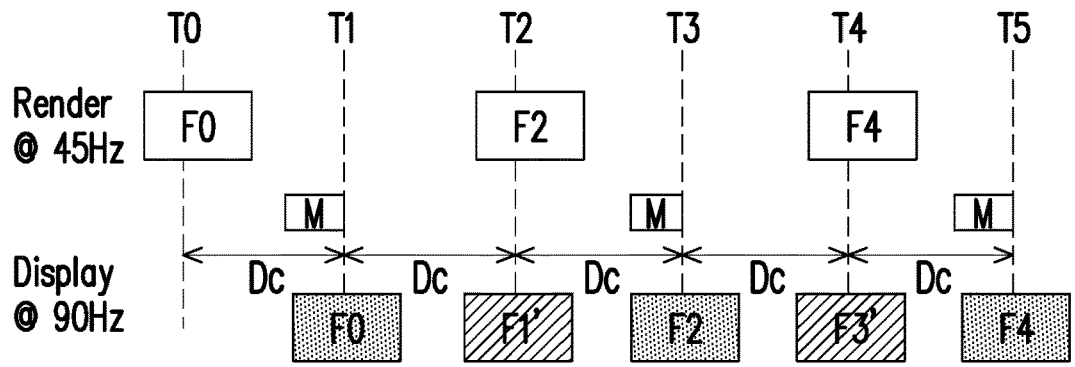
FIG. 4C illustrates a frame progression of a proposed VR system running at 45 Hz in accordance with one of the exemplary embodiments of the disclosure.

To provide better comprehension on the proposed method and system, FIG. 4A, FIG. 4B, FIG. 4C are illustrated hereafter for comparative purposes.

FIG. 4A illustrates a frame progression of an existing VR system running at 90 Hz, and FIG. 4B illustrates a frame progression of an existing VR system running at 45 Hz.

Referring first to FIG. 4A, a rendering rate of a GPU in the VR system to render frames F0-F5 would be the same as a screen refresh rate of a VR headset (both at 90 Hz), and movements of the VR headset are detected at time T0-T5. In order to reduce system latency such as motion-to-photon latency, a higher screen refresh rate of the VR headset would be a necessity. In this case, the motion-to-photon latency would be $D_A$. Nonetheless, a higher rendering rate of the GPU as well as a higher screen refresh rate of the VR headset would cause exponential growth on hardware performance requirements. A common approach to relieve the computing task of the VR system is to reduce the rendering rate of the GPU as illustrated in FIG. 4B to only render frames F0, F2, F4 (at 45 Hz as provided by most graphics cards in the market). However, motion-to-photo latency in this case would be greatly increased to $D_B$, and the output to the VR headset would be repeated every frame of its previous frame and thereby causing judder and blur. The technology of Asynchronous TimeWarp (ATW) and Asynchronous SpaceWarp (ASW) have been proposed to minimize fatigue and discomfort. ATW would solve the latency caused by head movements as well as the judder and blur caused by viewpoints, and yet it would not consider the movement of video content. ASW would solve the judder and blur caused by the movement of video content, but it does not consider the judder and blur caused by viewpoints due to head movements.

On the other hand, FIG. 4C illustrates a frame progression of a proposed VR system in accordance with one of exemplary embodiments of the disclosure. Referring to FIG. 4C, a GPU of the proposed VR system would still render frames F0, F2, F4 at a reduced rendering rate 45 Hz. The MEMC technique M used by the proposed VR system would insert interpolated frames F1' and F3', motion-to-photo latency in this case would be reduced to $D_C$, and the proposed VR system would be able to deliver a visual experience that is almost as good as 90 Hz rendering performance.

Figure 5:
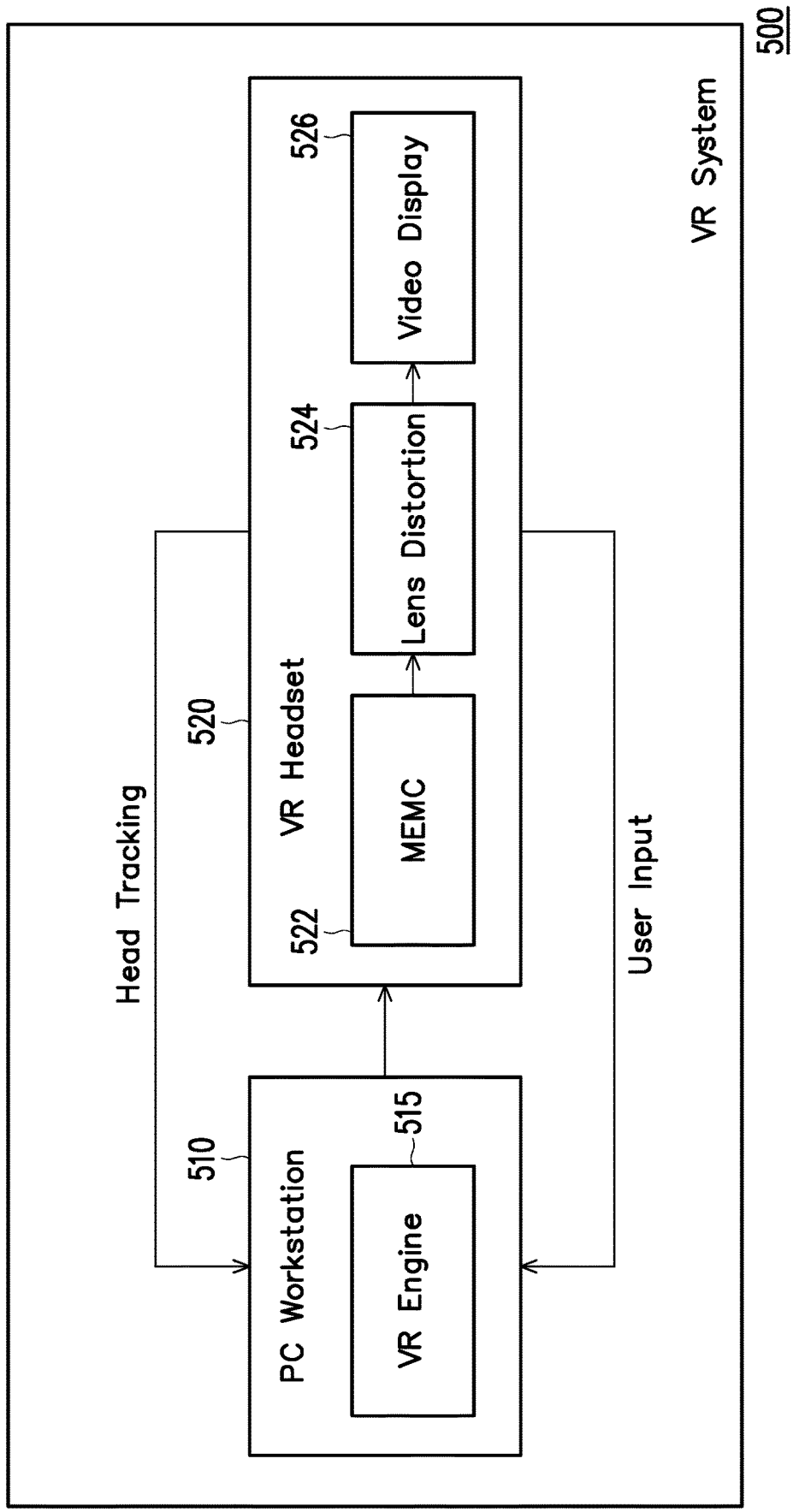
FIG. 5 illustrates a functional block diagram of a proposed method in accordance with one of the exemplary embodiments of the disclosure.

The proposed method may be summarized by FIG. 5 in terms of a functional block diagram in accordance with one of the exemplary embodiments of the disclosure. Referring to FIG. 5, a proposed VR system 500 would include a PC workstation 510 (similar to the computing device 150) and a VR headset 520 (similar to the head-mounted display 100). The PC workstation 510 would provide a 45 fps video signal to the VR headset 520 via, for example, a HDMI cable based on head tracking and user input. The VR headset 520 would perform MEMC 522 on the lower frame-rate video signal to render interpolated frames, perform lens distortion 524 thereon, and generate a 90 fps video signal for video display 526.

In view of the aforementioned descriptions, the proposed method and system use a motion-estimated and motion-compensated frame interpolation approach to deliver a better visual experience with reduced hardware performance requirements and with no additional system latency.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for video frame processing, applicable to a system including a computing device and a head-mounted display having a motion sensor, a processor, and a display, comprising:

receiving a sequence of rendered video frames by the processor from the computing device, wherein the rendered video frames comprise a first frame and a second frame subsequent to the first frame;

obtaining a first head movement of the head-mounted display from the motion sensor by the processor, wherein the first head movement is associated with the first frame;

estimating a predicted head angle corresponding to an interpolated time point associated with an interpolated frame by the processor according to a first head angle corresponding to the first head movement;

performing motion estimation on the first frame and the second frame by the processor to obtain a first motion vector;

estimating an interpolated motion vector corresponding to the interpolated frame by the processor according to the first motion vector;

generating an interpolated content by the processor according to the interpolated motion vector;

transforming the predicted head angle to a view matrix by the processor;

rendering the interpolated frame by the processor according to the interpolated content and the view matrix; and displaying the interpolated frame, subsequent to the first frame and prior to the second frame, on the display by the processor.

2. The method according to claim 1, wherein the first head angle corresponds to a first time point, and wherein the step of estimating the predicted head angle corresponding to the interpolated time point associated with the interpolated frame by the processor according to the first head angle corresponding to the first head movement comprises:

obtaining a first angular velocity and a first angular acceleration from the motion sensor by the processor, wherein the first angular velocity and the first angular acceleration correspond to the first time point; and estimating the predicted head angle corresponding to the interpolated time point by the processor according to the first head angle, the first angular velocity, and the first angular acceleration.

3. The method according to claim 1, wherein after the step of rendering the interpolated frame by the processor, the method further comprises:

performing lens distortion on the interpolated frame by the processor.

4. A system for video frame processing, comprising:
a computing device; and
a head-mounted display, comprising:
- a motion sensor, configured to detect movements of the head-mounted display;
- a display, configured to display rendered video frames;
- a processor, configured to:
  - receive a sequence of rendered video frames from the computing device, wherein the rendered video frames comprise a first frame and a second frame subsequent to the first frame;
  - obtain a first head movement of the head-mounted display from the motion sensor, wherein the first head movement is associated with the first frame;
  - estimate a predicted head angle corresponding to an interpolated time point associated with an interpolated frame according to a first head angle corresponding to the first head movement;
  - perform motion estimation on the first frame and the second frame to obtain a first motion vector;
  - estimate an interpolated motion vector corresponding to the interpolated frame according to the first motion vector;
  - generate an interpolated content according to the interpolated motion vector;
  - transform the predicted head angle to a view matrix;
  - render the interpolated frame according to the interpolated content and the view matrix; and
  - display the interpolated frame, subsequent to the first frame and prior to the second frame, on the display.

5. The system according to claim 4, wherein the processor is configured to:
- obtain a first angular velocity and a first angular acceleration from the motion sensor, wherein the first angular velocity and the first angular acceleration correspond to the first time point; and
- estimate the predicted head angle corresponding to the interpolated time point according to the first head angle, the first angular velocity, and the first angular acceleration.

6. The system according to claim 4, wherein the processor is further configured to:
perform lens distortion on the interpolated frame.

7. The system according to claim 4, wherein the head-mounted display is externally-connected to the computing device.

8. The system according to claim 4, wherein the computing device is integrated with the head-mounted display.

9. The system according to claim 4, wherein a frame rate of the sequence of rendered video frames rendered by the computing device is lower than that of the first frame, the interpolated frame, and the second frame displayed on the head-mounted display.

* * * * *